(12) United States Patent
Boerkel

(10) Patent No.: US 7,963,156 B2
(45) Date of Patent: Jun. 21, 2011

(54) METHOD TO DETERMINE A FUEL COMPOSITION

(75) Inventor: Wolfgang Boerkel, Benningen (DE)

(73) Assignee: Robert Bosch GmbH, Stuttgart (DE)

( * ) Notice: Subject to any disclaimer, the term of this patent is extended or adjusted under 35 U.S.C. 154(b) by 271 days.

(21) Appl. No.: 12/126,075

(22) Filed: May 23, 2008

(65) Prior Publication Data

US 2008/0289401 A1 Nov. 27, 2008

(30) Foreign Application Priority Data

May 23, 2007 (DE) .......................... 10 2007 023 900

(51) Int. Cl.
*G01M 15/08* (2006.01)
(52) U.S. Cl. .................................... 73/114.55; 73/61.47
(58) Field of Classification Search ................. 73/61.47, 73/114.55
See application file for complete search history.

(56) References Cited

U.S. PATENT DOCUMENTS

| 4,703,732 | A | * | 11/1987 | Wineland et al. | ........ 123/406.47 |
| 4,706,630 | A | * | 11/1987 | Wineland et al. | ............. 123/478 |
| 4,905,649 | A | * | 3/1990 | Washino et al. | ............... 123/435 |
| 4,920,494 | A | * | 4/1990 | Abo et al. | ...................... 701/104 |
| 4,955,345 | A | * | 9/1990 | Brown et al. | ................. 123/381 |
| 5,050,555 | A | | 9/1991 | Mitsumoto | |
| 5,271,357 | A | * | 12/1993 | Hsu et al. | ......................... 123/23 |
| 7,681,561 | B2 | * | 3/2010 | Hilditch | ........................ 123/575 |
| 2009/0306875 | A1 | * | 12/2009 | Jiang et al. | .................... 701/102 |

* cited by examiner

*Primary Examiner* — Freddie Kirkland, III
(74) *Attorney, Agent, or Firm* — Merchant & Gould P.C.

(57) ABSTRACT

A method to determine the fuel composition of a fuel mixture from a first fuel and a second fuel for the operation of an internal combustion engine. The first and the second fuel have different combustion rates and/or different specific energy contents and the internal combustion engine has at least one pressure sensor in at least one combustion chamber, with which a temporal pressure curve and/or a pressure curve under conditions of angular synchronism is determined.

9 Claims, No Drawings

METHOD TO DETERMINE A FUEL COMPOSITION

TECHNICAL FIELD

The invention concerns a method to determine the fuel composition of a fuel mixture from a first fuel and a second fuel for the operation of an internal combustion engine, wherein the first and the second fuel have different combustion rates and/or different specific energy contents and wherein the internal combustion engine has at least one pressure sensor in at least one combustion chamber, with which a temporal pressure curve and/or a pressure curve under conditions of angular synchronism is determined in the combustion chamber.

BACKGROUND

Internal combustion engines on the basis of gasoline engines are generally operated with fuel from hydrocarbons, from fossil fuels based on refined crude oil. Ethanol produced from renewable resources (plants) or another kind of alcohol is increasingly being added in various mixing ratios to the fuel. In the USA and Europe a mixture of 70-85% ethanol and 15-30% gasoline is often distributed under the trade name E85. The internal combustion engines are designed in such a way that they can be operated with pure gasoline as well as with mixtures up to E85. This is denoted as a "flex-fuel operation". The operating parameters in the flex-fuel operation in each case have to be adapted to the existing fuel mixture for an efficient operation with only a small discharge of toxic emissions; while at the same time high engine performance and a good starting capability are guaranteed. A stoichiometric fuel-air mixture ratio is, for example, present at 14.7 volumetric parts of air per part of gasoline; however, when using ethanol, a proportion of air of 9 volumetric parts must be set. Small and/or slow changes in the alcohol content can be detected and taken into account by the engine management system of the internal combustion engine by means of a lambda probe and/or a knock sensor. Rapid changes with a significant deviation in the composition of the fuel mixture can also occur, for example, after filling the tank (fueling). If the internal combustion engine were operated with 100% gasoline and filled with E85 when the tank was close to empty, problems in starting and disturbances in the combustion can arise, which can also increase the harmful exhaust gas emissions. According to the state of the art, such rapid changes in the composition of the fuel can be detected using an alcohol sensor. This component, however, increases the cost of the internal combustion engine.

It is the task of the invention to provide a method, which allows for a reliable, cost effective detection of the composition of a fuel mixture from gasoline and alcohol.

SUMMARY OF THE INVENTION

The task of the invention is thereby solved, in that during a combustion phase the composition of the fuel mixture is determined from the temporal pressure curve and/or the pressure curve under conditions of angular synchronism of the gas pressure in the combustion chamber, of which there is at least one. A fuel mixture from fuels with different combustion rates exists, for example, in an alcohol-gasoline mixture, for example ethanol and methanol. Ethanol and methanol have a faster combustion process than gasoline. For that reason, the proportion of alcohol in the fuel mixture can, for example, be suggested from the time difference between ignition and maximum pressure in the combustion chamber. The method is, however, not limited to the determination of the alcohol content. The proportion of another component with another combustion characteristic in the gasoline can, for example, be determined from the different combustion rate. The method according to the invention has the advantage, in that the alcohol content can already be determined shortly after cold starting the engine, if a method based on the signal of a lambda probe can not yet be executed because the lambda probe has not yet achieved its operating temperature. The method can likewise be used if the closed-loop lambda control is suspended during an operating phase of the internal combustion engine. Furthermore, the method according to the invention can be implemented in one or in a small number of combustion cycles, while methods based on the signal of the lambda probe require a significantly longer time period. The method can be employed in internal combustion engines, which have a pressure sensor in at least one combustion chamber. Provision can, however, be made for the method to be used in selected or in all of the cylinders of the internal combustion engine.

The method according to the invention has the advantage, in that the determination of the composition of the fuel mixture is insensitive to errors in the composition of the fuel-air mixture. Methods to determine the alcohol proportion from a signal of a lambda probe can not distinguish errors in determining the air mass and/or the fuel metering from deviations resulting from the composition of the fuel. When combining the method according to the invention with an evaluation of the signal of the lambda probe, the alcohol proportion as well as the error in the fuel-mixture generation can, therefore, be detected and corrected.

Provision is made in a variation of the method for the composition of the fuel mixture to be determined from a time difference between ignition and maximum pressure and/or the combustion focal point and/or another characteristic point of the combustion cycle and/or the relative position of characteristic points of combustion to each other. This is possible because alcohol has a faster combustion process than gasoline.

Provision is made in an alternative variation of the method for the composition of the fuel mixture to be determined from a steepness of a pressure increase at a predetermined point in time and/or angle of rotation of the crankshaft. In so doing, as a function of the point in time of ignition, a point in time or an angle of rotation of the crankshaft at a known rotational speed of the crankshaft is established, at which the steepness of the pressure increase is determined. The proportion of alcohol in the fuel mixture can be determined from the steepness of the pressure increase because alcohol has a higher combustion rate than gasoline.

During a combustion cycle of gasoline, a pressure increase, which occurs later, and a slower combustion process take place in comparison to a combustion cycle of alcohol under otherwise identical conditions. For that reason provision is made in an embodiment of the method for the composition of the fuel mixture to be determined from the period of time of an ignition delay phase and/or a conversion phase and/or a combustion phase.

During a combustion cycle of alcohol, a higher maximum pressure occurs in the combustion chamber in comparison to a combustion cycle of gasoline under otherwise identical conditions. For that reason provision is made in an embodiment of the method for the composition of the fuel mixture to be determined from a maximum pressure in the combustion chamber.

Provision is made in a variation of the method, which allows for a particularly accurate determination of the proportion of alcohol and which is insensitive to interfering influences, for the composition of the fuel mixture to be determined from a combination of the aforementioned characteristics of the temporal pressure curve and/or the pressure curve under conditions of angular synchronism.

Provision is made in an embodiment of the method for the composition of the fuel mixture to thereby be determined, in that the ignition timing is displaced in such a way that the maximum pressure in the combustion chamber and/or the combustion focal point and/or another characteristic value of the combustion cycle is achieved at a predetermined angle of rotation of the crankshaft and in that the composition of the fuel mixture is determined from the angle of rotation of the crankshaft at the point in time of ignition. In this way the delivered performance and the emission of toxic substances of the internal combustion engine can be optimized. Provision can be made for the acquisition of the displacement of the ignition timing to occur only at one or selected cylinders of the internal combustion engine. The method can also be used for the displacement of the ignition timing to be individually tailored to each and all cylinders.

If the method to determine the composition of a gasoline/alcohol-fuel mixture is used, the determination of the composition of the fuel mixture can occur faster than when a sole determination results from the signal of a lambda probe. In addition fuel mixture errors as a result of the determination of the air mass and the fuel metering can be separated from the determination of the alcohol content of the fuel.

The invention claimed is:

1. A method of determining a composition of a fuel mixture from a first fuel and at least a second fuel for operation of an internal combustion engine, wherein the first fuel and at least a second fuel have different combustion rates or different specific energy contents, in that the internal combustion engine has at least one pressure sensor in at least one combustion chamber, wherein the at least one pressure sensor determines an individual temporal pressure curve or an individual pressure curve under an angular synchronism condition, the method comprising:
   determining the composition of the fuel mixture during an individual combustion phase of the internal combustion engine from at least one of: an individual temporal pressure curve of the individual combustion phase; and an individual pressure curve under conditions of angular synchronism of a gas pressure in the at least one combustion chamber of the individual combustion phase.

2. A method according to claim 1, further comprising determining the composition of the fuel mixture from a relative timing difference between an ignition of the internal combustion engine operating under conditions of angular synchronism and a maximum pressure, a combustion focal point, from a relative timing difference between the ignition and any of a plurality of characteristic points of combustion with respect to each other.

3. A method according to claim 1, further comprising determining the composition of the fuel mixture from a rate of a pressure increase occurring at a predetermined point in time or from an angle of rotation of a crankshaft.

4. A method according to claim 1 further comprising determining the composition of the fuel mixture from a time period of at least one of a plurality of phases, wherein a plurality of phases includes at least an ignition delay phase and a conversion phase and a combustion phase.

5. A method according to claim 1, further comprising determining the composition of the fuel mixture from a maximum pressure in the combustion chamber.

6. A method according to claim 1, further comprising determining the composition of the fuel mixture from a combination of a plurality of characteristics of the temporal pressure curve or a combination of a plurality of characteristics of the pressure curve.

7. A method according to claim 1, further comprising determining the composition of the fuel mixture from an angle of rotation of a crankshaft at a specific point in time of an ignition, wherein an ignition timing is displaced in such a way that a maximum pressure in the combustion chamber, a combustion focal point, or any of a plurality of characteristic values of a combustion cycle is achieved at a predetermined angle of rotation of a crankshaft.

8. A method of using an internal combustion engine having at least one pressure sensor in at least one combustion chamber to determine the composition of a gasoline and an alcohol fuel mixture by determining a composition of a fuel mixture from a first fuel and at least a second fuel for the operation of an internal combustion engine, wherein the first fuel and at least a second fuel have different combustion rates or different specific energy contents, in that the internal combustion engine has at least one pressure sensor in at least one combustion chamber, wherein the at least one pressure sensor determines an individual temporal pressure curve or an individual pressure curve under an angular synchronism condition, the method comprising:
   determining the composition of the fuel mixture during an individual combustion phase of the internal combustion engine from at least one of: an individual temporal pressure curve of the individual combustion phase; and an individual pressure curve under conditions of angular synchronism of a gas pressure in the at least one combustion chamber of the individual combustion phase.

9. A method of using an internal combustion engine having at least one pressure sensor in at least one combustion chamber to determine the composition of a gasoline and a methanol fuel mixture or a gasoline and an ethanol fuel mixture by determining a composition of a fuel mixture from a first fuel and at least a second fuel for the operation of an internal combustion engine, wherein the first fuel and at least a second fuel have different combustion rates or different specific energy contents, in that the internal combustion engine has at least one pressure sensor in at least one combustion chamber, wherein the at least one pressure sensor determines a temporal pressure curve or a pressure curve under an angular synchronism condition, the method comprising:
   determining the composition of the fuel mixture during an individual combustion phase of the internal combustion engine from at least one of: an individual temporal pressure curve of the individual combustion phase; and an individual pressure curve under conditions of angular synchronism of a gas pressure in the at least one combustion chamber of the individual combustion phase.

* * * * *